United States Patent
Dori et al.

[15] 3,666,675
[45] May 30, 1972

[54] METHOD FOR PRODUCING LUMINESCENCE USING COMPLEX LUMINESCENT MATERIALS

[72] Inventors: Zvi Dori, Meadowbrook; Ronald F. Ziolo, Philadelphia, both of Pa.

[73] Assignee: Temple University, Philadelphia, Pa.

[22] Filed: Jan. 21, 1970

[21] Appl. No.: 4,749

[52] U.S. Cl. .................................................252/301.2 R
[51] Int. Cl. .........................................................C09k 1/02
[58] Field of Search..................................252/301.2, 301.3

[56] References Cited

FOREIGN PATENTS OR APPLICATIONS 1,237,309   3/1967   Germany

Primary Examiner—Robert D. Edmonds
Attorney—Paul & Paul

[57] ABSTRACT

Luminescence is produced by stimulating a ligand compound wherein the ligand forming atom, either phosphorus or arsenic, is bound in a complex molecule with three organic radicals, at least one of which is phenyl or tolyl, which in turn is complexed with a metal having a closed $d^{10}$ outer shell.

10 Claims, No Drawings

METHOD FOR PRODUCING LUMINESCENCE USING COMPLEX LUMINESCENT MATERIALS

The present invention is directed to a new use of a broad class of chemical compounds. More specifically, this invention is directed to a method of producing both photo-and tribo-luminescence using complex ligand compounds not heretofore known to produce luminescence, formed from relatively common and inexpensive starting materials.

Luminescent materials, which emit light when stimulated, are commonly used in or on instrument dials, clocks, in certain types of lamps, in cathode ray tubes, and in a wide variety of other applications. Methods for producing luminescence by stimulating such materials with electromagnetic radiation in the visible or near visible region and by mechanically treating the materials such as by grinding them or striking them, are well known. Response to the former type of stimuli is generally known as photo-luminescence and response to the latter type is known as tribo-luminescence.

Many types of photo-luminescent and tribo-luminescent materials are known, but for the most part these materials are not common materials and are therefore often expensive and limited as to availability.

It is therefore the general object of the present invention to provide photo-luminescent and tribo-luminescent materials which are less expensive and more readily available than those generally heretofore used for similar purposes. More specifically, it is an object of the present invention to produce either photo- or tribo-luminescence by stimulating this class of materials.

These and other objects are met, in accordance with the present invention, by the method of producing luminescence consisting of exciting a ligand compound wherein the ligand forming atom, either phosphorus or arsenic, is bound in a complex molecule with three organic radicals, at least one of which is phenyl or tolyl, which in turn is complexed with a metal having a closed $d^{10}$ outer shell, i.e., a $d^{10}$ shell completely filled with electrons. Metals of this type include, with their valence given as a superscript, nickel$^{0}$, palladium$^{0}$, platinum$^{0}$, copper$^{+1}$, silver$^{+1}$, gold$^{+1}$, zinc$^{+2}$, cadmium$^{+2}$, mercury$^{+2}$, aluminum$^{+3}$, thallium$^{+3}$, and indium$^{+3}$.

Generally, the compounds which may be used in producing luminescence according to the present invention are defined by the following formula:

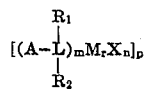

wherein

R is a monovalent organic radical selected from the group consisting of aryls, lower alkyls, cycloalkyls and lower alkoxies, A is an aryl selected from the group consisting of tolyl and phenyl, L is a ligand forming atom selected from the group consisting of phosphorus and arsenic, $m$ is an integer from 1 to 4, M is a metal having a closed $d^{10}$ outer electron shell $r$ is an integer from 1 to 2

X is a monovalent anion selected from the group consisting of bromide, chloride, iodide, fluoride, tetrafluoroborate, nitrate, perchlorate, cyanate, azide, thiocyanate, isocyanate, carbon disulfide-azide adduct, and trifluoroacetionitrile-azide adduct, $n$ is an integer from 0 to 3 equal to the total valence state of metal M, and $p$ is an integer from 1 to 4.

In particular, it has been found that compounds within the foregoing definition respond to excitation by electromagnetic radiation in the wavelength range of 3,00–4,000 angstroms.

It has also been found that some of these compounds such as the triphenyl phosphorus complex with copper chloride, [triphenyl P]$_3$ CuCl and the triphenyl phosphorus complex of copper cyanate, [triphenyl P]$_2$ CuNCO, in a crystalline size of greater than 10 microns, when rubbed between ground-glass slides emit visible light, thus demonstrating tribo-luminescence.

In testing the photo-luminescence of the materials excited for that purpose in accordance with the present invention, generally the dry, solid compound was tested at room temperature and at liquid nitrogen temperature (−196° C.) and each of these compounds was observed with the unaided eye to luminesce brightly in a dimly lit room when held under the rays of a lamp emitting long wave ultraviolet light (3,650 angstroms) — the familiar "black light". Any H4-type mercury vapor electric discharge lamp may be used for this purpose. Luminescence was also detected with the compounds in the dissolved state in a mixture of EPA (a commercially available mixture of diethylether, isopentane and ethanol) and chloroform at −196° C using a standard spectrophotometer, namely a Hitachi Perkin Elmer Fluorescence Spectrophotometer MPF-2A with a xenon excitation source. The spectral sensitivity of this machine lay in the ultraviolet and visible regions of the spectrum; no emission was studied in the near infrared.

Methods for preparing compounds which are taught herein to be useful as luminescent materials are well known. For example, ligand complexes of metals with metals of group I-B of the Periodic Table with a closed $d^{10}$ outer shell have been disclosed in the Journal of the American Chemical Society, 90, 6560 (1968) by the present inventors. The preparation of other compounds within this group has also been disclosed in the Journal of Inorganic and Nuclear Chemistry, 30, 1329 (1968), the Journal of Inorganic and Nuclear Chemistry, 26, 963 (1964), the Journal of the Chemical Society (London) 5268 (1960), and Gazetta Chimica Italiana, 95, 3 (1965). Similar compounds from metals of group II-B of the Periodic Table may be prepared in accordance with publications in the Journal of Inorganic Nuclear Chemistry, 1962, Vol. 24, pgs. 169 to 178 and 1,221 to 1,224, and Annalen der Chemie, 560, 108 (1948). Methods for preparing such compounds of nickel, palladium, and platinum of group VIII of the Periodic Table has been disclosed in Coordination Chemistry Reviews, 3, 319 (1968). Journal of the Chemical Society, 2323 (1958), and Inorganica Chimica Acta, 3:1, pg. 8, Mar. 1969.

The following examples demonstrate how some of the compounds, prepared in accordance with the foregoing publication, have been made to emit light in response to electromagnetic radiation stimuli.

EXAMPLE 1

About 20 grams of [ (triphenyl P) CuI ]$_4$ was thoroughly dried and placed in a clear glass vial with a stopper. When the vial was held under a "black light" in a dark room, the compound luminesced a bright yellow. When the "black light" was removed, the luminescence ceased.

A small amount of the solid powdered compound was placed in a sample holder of the Hitachi instrument previously described. The maximum excitation wavelength of the compound was at 3,500 angstroms while the maximum emission wavelength of the sample was at 5,200 angstroms.

EXAMPLE 2

The chloride and bromide corresponding to the iodide tested in Example 1 were made, tested and observed as in the foregoing example and found to be brightly luminescent, their luminescence being blue-green. The chloride and bromide corresponding compounds, each excited at 3,500 angstroms produced maximum emissions at 4,500–4,800 angstroms and 4,400–4,800 angstroms, respectively.

EXAMPLE 3

A similar test of a powdered sample of (triphenyl P)$_2$ ZnCl$_2$ was examined as above and with the excitation at 3,480 angstroms, maximum emission was found at 3,800 angstroms.

EXAMPLE 4

Similarly (triphenyl P)$_3$ CuCl when excited at 3,600 angstroms, gave a maximum emission at 4,400–4,700 angstroms.

It should be noted that the foregoing examples were tested at room temperature. In many cases the brightness of the luminescence may be increased by lowering the temperature of the sample to as low as the boiling point of nitrogen, −196° C. This is especially true for the compounds of silver, gold, cadmium, and mercury. Because of this temperature sensitivity, the compounds taught herein as luminescent materials may find use as temperature sensing means. Further, the observed luminescence in many cases provides a ready, easy, and immediate means of identification of a compound. For example, (triphenyl$_3$P)$_{33}$P)$_4$Pt may result from the same reaction mixture depending on conditions. The usual means of distinguishing the two species would be through a costly elemental analysis. However these species could be distinguished simply by observing their luminescence; one is bright orange, the other is red. Likewise one might obtain (triphenyl$_3$P)$_3$ CuCl or (triphenyl$_3$P)$_3$Cu$_2$Cl$_2$ from a reaction mixture. Whichever is formed may be identified immediately by its luminescence; the former is blue-green, the latter, yellow.

Included among the compounds within the group defined above which have been specifically tested and found to be luminescent are the following:

| | |
|---|---|
| [(triphenyl P) CuI]$_4$ | [(para-tolyl$_3$P) CuCl]$_4$ |
| [(triphenyl P) CuCl]$_4$ | (CH$_3$diphenyl P)$_3$ CuBr |
| [(triphenyl P) CuBr]$_4$ | (CH$_3$diphenyl P)$_3$ CuCl |
| (triphenyl P)$_2$ ZnCl$_2$ | (CH$_3$diphenyl P)$_3$ CuI |
| (triphenyl P)$_3$ CuCl | [(CH$_3$diphenyl P) CuBr]$_4$ |
| (triphenyl P)$_3$ AgBr | [(CH$_3$diphenyl P) CuCl]$_4$ |
| (triphenyl P)$_3$ AgCl | [(CH$_3$diphenyl P) CuI]$_4$ |
| (triphenyl P)$_3$ AgI | (triphenyl P)$_2$ CuCN |
| [(triphenyl P) AgBr]$_4$ | (triphenyl P)$_2$ CuN$_3$ |
| [(triphenyl P) AgCl]$_4$ | (triphenyl P)$_2$ CuN$_3$·CS$_2$ |
| [(triphenyl P) AgI]$_4$ | (triphenyl P)$_2$ CuN$_3$·CF$_3$CN |
| (triphenyl P)$_2$ CuNCS | [(ethoxy) diphenyl P] Ni |
| (triphenyl P)$_2$ CuNCO | [(ethoxy)$_2$ phenyl P] Ni |
| [(triphenyl As) CuCl]$_4$ | (triphenyl P)$_3$ Pt |
| [(methoxy) diphenyl P]$_4$ Ni | (triphenyl P)$_4$ Pt |
| [(methoxy)$_2$ phenyl P]$_4$ Ni | (triphenyl P)$_2$ CuBr |
| (triphenyl P)$_2$ CuI | (triphenyl P)$_2$ CuCl |
| (triphenyl P)$_2$ AgNCS | (triphenyl P)$_3$ Cu$_2$Cl$_2$ |
| (triphenyl P)$_3$ Cu$_2$Br$_2$ | (triphenyl P)$_3$ Cu$_2$I$_2$ |
| (triphenyl P)$_2$ CdI$_2$ | (triphenyl P)$_2$ CdBr$_2$ |
| (triphenyl P)$_2$ HgCl$_2$ | (triphenyl P)$_2$ HgBr$_2$ |
| [(cyclohexyl diphenyl P)CuCl]$_4$ | (triphenyl P)$_2$ AgNCO |

What is claimed is:

1. The method of producing luminescence consisting of exciting with light in the wavelength range of 3,000–4,000 angstroms a ligand complex compound having the formula:

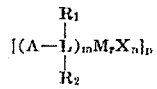

wherein

R is a monovalent organic radical selected from the group consisting of phenyl, tolyl, lower alkyls, cycloalkyls and lower alkoxies, A is an aryl selected from the group consisting of tolyl and phenyl, L is a ligand forming atom selected from the group consisting of phosphorus and arsenic, m is an integer from 1 to 4, M is a metal having a closed $d^{10}$ outer electron shell r is an integer from 1 to 2

X is a monovalent anion selected from the group consisting of bromide, chloride, iodide, fluoride, tetrafluoroborate, nitrate, perchlorate, cyanate, azide, thiocyanate, isocyanate, carbon disulfide-azide adduct, and trifluoroacetonitrile-azide adduct, n is an integer from 0 to 3 equal to the total valence state of metal M, and p is an integer from 1 to 4.

2. A method of producing luminescence, as recited in claim 1, wherein M is a metal substituent selected from the group consisting of Ni°, Pd°, Pt°, Cu$^+$, Ag$^+$, Au$^+$, Zn$^{+2}$, Cd$^{+2}$, Hg$^{+2}$, Al$^{+3}$, Th$^{+3}$, and In$^{+3}$.

3. A method of producing luminescence, as recited in claim 1, wherein said compound is excited by the incidence thereon of ultraviolet light on the order of 3,500 angstroms wavelength.

4. A method of producing luminescence, as recited in claim 1, wherein said compound is excited with light in the wavelength range of 3,000–4,000 angstroms.

5. A method, as recited in claim 4, wherein said compound is selected from the group consisting of:

| | |
|---|---|
| [(triphenyl P) CuI]$_4$ | [(para-tolyl)3P CuCl]$_4$ |
| [(triphenyl P) CuCl]$_4$ | (CH$_3$diphenyl P)$_3$ CuBr |
| [(triphenyl P) CuBr]$_4$ | (CH$_3$diphenyl P)$_3$ CuCl |
| (triphenyl P)$_2$ | |
| (triphenyl P)$_3$ CuCl | [(CH$_3$diphenyl P) CuBr]$_4$ |
| (triphenyl P)$_3$ AgBr | [(CH$_3$diphenyl P) CuCl]$_4$ |
| (triphenyl P)$_3$ AgCl | [(CH$_3$diphenyl P) CuI]$_4$ |
| (triphenyl P)$_3$ AgI | (triphenyl P)$_2$ CuCN |
| [(triphenyl P) AgBr]$_4$ | (triphenyl P)$_2$ CuN$_3$ |
| [(triphenyl P) AgCl]$_4$ | (triphenyl P)$_2$ CuN$_3$·CS$_2$ |
| [(triphenyl P) AgI]$_4$ | (triphenyl P)$_2$ CuN$_3$·CF$_3$CN |
| (triphenyl P)$_2$ CuNCS | [ethoxy)diphenyl P]$_4$Ni |
| (triphenyl P)$_2$ CuNCO | [(ethoxy)$_2$ phenyl P] Ni |
| [(triphenyl As) CuCl]$_4$ | (triphenyl P)$_3$ Pt |
| [(methoxy) diphenyl P]$_4$ Ni | (triphenyl P)$_4$ Pt |
| [(methoxy)$_2$ phenyl P]$_4$ Ni | (triphenyl P)$_2$ CuBr |
| (triphenyl P)$_3$ CuI | (triphenyl P)$_2$ CuCl |
| (triphenyl P)$_3$ AgNCS | (triphenyl P)$_3$ Cu$_2$Cl$_2$ |
| (triphenyl P)$_3$ Cu$_2$Br$_2$ | (triphenyl P)$_3$ Cu$_2$I$_2$ |
| (triphenyl P)$_2$ CdI$_2$ | (triphenyl P)$_2$ CdBr$_2$ |
| (triphenyl P)$_2$ HgCl$_2$ | (triphenyl P)$_2$ HgBr$_2$ |
| [(cyclohexyl diphenyl P)CuCl]$_4$ | (triphenyl P)$_2$ AgNCO |

6. A method, as recited in claim 4, wherein said compound is (triphenyl P)$_4$ Pt.

7. A method as recited in claim 4, wherein said compound is (triphenyl P)$_3$ CuCl.

8. A method, as recited in claim 4, wherein said compound is [(triphenyl P) CuI]$_4$.

9. A method, as recited in claim 4, wherein said compound is (triphenyl P)$_2$ ZnCl$_2$.

10. A method, as recited in claim 4, wherein said compound is [(ethoxy)$_2$ phenyl P] Ni.

* * * * *